C. W. GRAHAM.
SOLDERING MACHINE.
APPLICATION FILED JUNE 6, 1905.

920,320.

Patented May 4, 1909.

WITNESSES:
Chas. J. Clagett
J. Clyde Ripley

INVENTOR
C. W. Graham
BY his ATTORNEYS
Warfield & Duell

UNITED STATES PATENT OFFICE.

CHARLES W. GRAHAM, OF ROME, NEW YORK, ASSIGNOR TO UTICA INDUSTRIAL COMPANY, OF ROME, NEW YORK, A CORPORATION OF NEW YORK.

SOLDERING-MACHINE.

No. 920,320.      Specification of Letters Patent.      Patented May 4, 1909.

Application filed June 6, 1905. Serial No. 263,956.

*To all whom it may concern:*

Be it known that I, CHARLES W. GRAHAM, residing at Rome, in the county of Oneida and State of New York, have invented certain new and useful Improvements in Soldering-Machines, of which the following is a full, clear, and exact description, such as will enable others skilled in the art to which it appertains to make and use the same.

This invention relates to soldering machines.

One of the objects thereof is to provide machinery of the above type wherein solder is economically used.

Another object is to provide such machinery adapted to accomplish its functions efficiently without soiling the article soldered.

Another object is to provide soldering means wherein injurious effects of varying temperature of parts of the machine are done away with.

Another object is to provide soldering machinery characterized, in general, by simple and readily adjustable construction and economy and accuracy of action.

Other objects will be in part obvious and in part pointed out hereinafter.

The invention accordingly consists in the features of construction, combinations of elements and arrangement of parts which will be exemplified in the apparatus and devices hereinafter described and the scope of the application of which will be indicated in the following claims.

Figure 1:
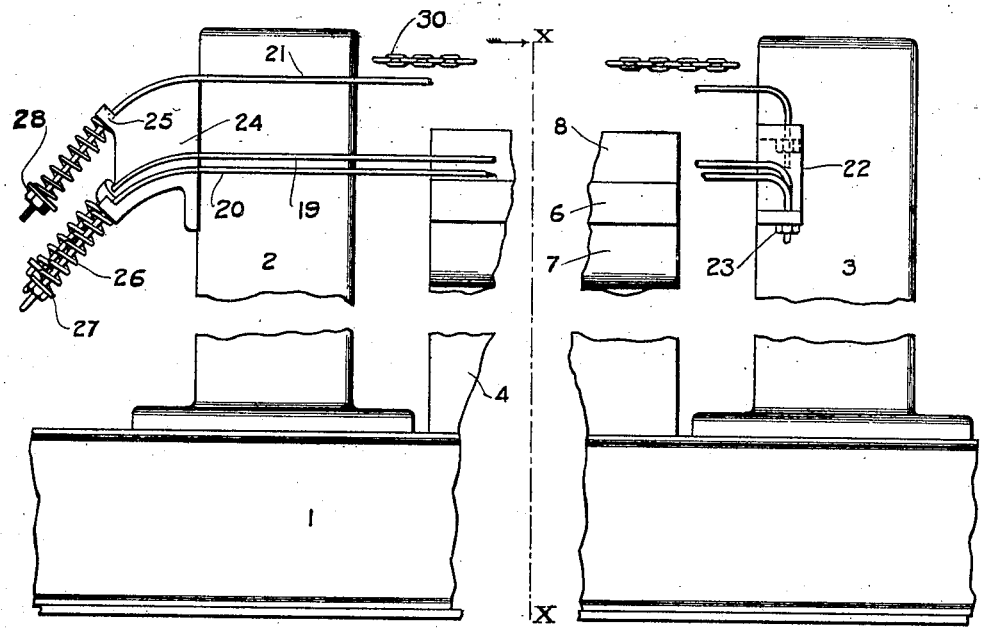
Figure 2:
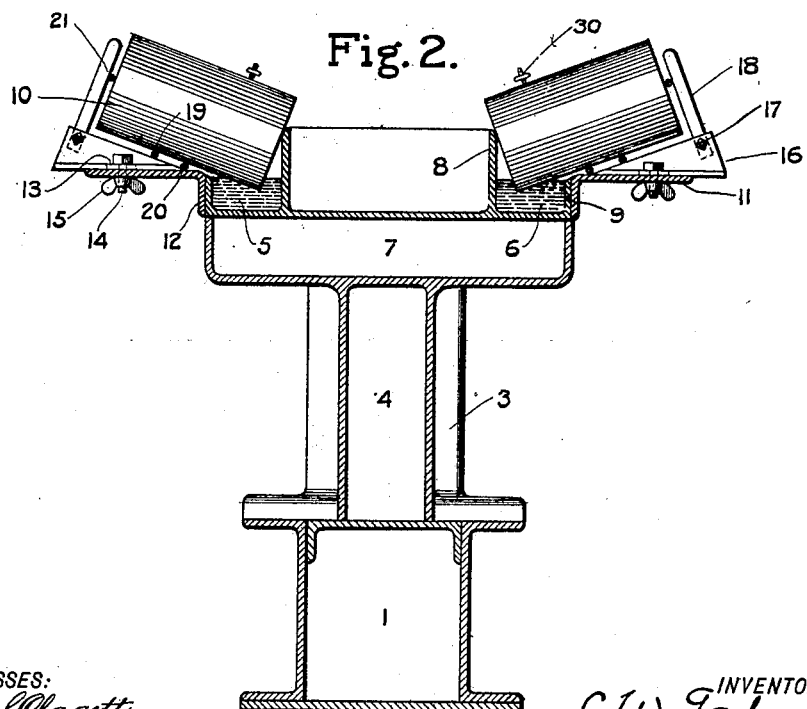

In the accompanying drawings, wherein is shown one of various possible embodiments of the several features of my invention: Figure 1 is a side elevation of the same, certain parts being broken away. Fig. 2 is a sectional view taken substantially on the line *x—x* of Fig. 1 and in the direction indicated by the arrow.

Similar reference characters refer to similar parts throughout both views.

In order to render clearer certain features of my invention, it may first be noted that I have found that, in connection with machinery of the general nature of that with which this invention deals, if the article to be soldered be rigidly held in position, any distortion of the guiding means, whether by variations in temperature or otherwise, is likely to result in the work being cramped or binding, with a consequent delay and chance of injury to the article soldered. It may also be noted that I have found that if the article to be soldered rests against a flat surface, there is a tendency for the article to become soiled owing to the accumulation of solder or other material upon such surface. The above and other defects are remedied and many positive advantages attained in constructions of the nature of that hereinafter described.

Referring now to Fig. 1 of the drawings, there is shown a base or bed 1, upon which are mounted pillars or supports 2 and 3 for a purpose hereinafter described. Between these supports there is mounted upon the bed 1, but entirely independent of the supports, what may be termed a "bath support" 4, the same having baths 5 and 6 upon the sides thereof with a fire box or other source of heat 7 positioned below. It may here be noted that the term "bath" is used herein in a broad sense as denoting any receptacle adapted to hold a liquid. As both sides of the bath support with associated parts are substantially identical, one only will be described. Bath 5 comprises walls 8 and 9, the inner of which is carried upwardly so as to form a rest or support for one end of a can or other article to be soldered 10. Secured to the outer wall 9 is a plate 11 flanged as shown at 12, and having adjustably mounted thereon as by slots 13 and bolts 14, provided with wing nuts 15, a number of inclined supporting blocks 16. Upon the outer ends of these blocks are pivotally and adjustably mounted, as by bolts 17, arms 18, for a purpose hereinafter described.

Stretched between the supports 2 and 3 are wires 19, 20 and 21 secured at one end to the support 3 by means of a projecting abutment 22 over which they are bent and through which they pass, the ends being held in place by nuts 23 tapped thereon. The remaining ends of the wires are mounted on the support 2, the same passing over a curved arm 24 secured to the support and through rings 25 formed upon this arm. These wires are preferably mounted under an adjustable spring tension by means of springs 26 coiled about the same and compressed between the rings 25 and washers or disks 27 held upon the wires, as by means of nuts 28 tapped thereon. These wires are guided adjacent the bath 5, substantially as shown in Fig. 2 of the drawings, the wires 19 and 20 resting upon blocks 16 and thus being rendered adjustable in position by varying the position of the blocks with reference to the flange 12, as above described. The latter wires form the lower support for the cans 10 and are adapted to hold the same in an inclined position resting against the wall 8. The remaining wire 21, which is adjustably held by guide arms 18 against the upper ends of cans 10, serves to hold them against the walls 8 as the same are propelled through the solder 29. The latter operation is preferably accomplished, as by means of a chain 30 resting on the cans and rolling the same through the bath.

In order to avoid the chance of uncertainty in the interpretation of certain of the terms used throughout this description and the following claims, it may here be noted that the following terms are used with the meanings given below: By the term "wire" is meant a member of great length relative to its other dimensions and flexible to a considerable degree. By the term "flexible" is meant a quality by virtue of which a member may be distorted or sprung from the position which it occupies. By "solder" is meant any substance adapted upon being inserted between two members and heated to adhere to the surfaces thereof and join them one to another. By the term "spring-pressed" as used in the following claims is meant that characteristic of the parts described by virtue of which they are pressed or stretched through the direct or indirect action of a spring.

The operation of the above described embodiment of my invention is substantially as follows: Assuming a number of cans 10 to be positioned upon the bath 5, the same are propelled or rather rolled along the bath by propelling chain 30, the latter being driven in any desired manner. Cans 10 are thus rolled in proper relation throughout the entire length of the bath, and, owing to the adjustability of the several wires, articles of various diameters and lengths may be accommodated and so positioned with reference to the bath as to contact the same only at the desired points. Upon having traversed the bath 5, the cans may be placed in bath 6 and fed through the same in a manner substantially identical with that above-described, the other ends being placed in operative relation to the bath.

The several wires are adjusted in a manner which should be largely obvious and are readily removed, if necessary, as for purposes of cleansing or renewal.

Although in the illustrative embodiment shown, the cans are presupposed to be round and to be rolled through the bath, nevertheless, cans of angular conformation may be propelled in operative relation thereto, if desired, although my invention is peculiarly adapted for embodiment in soldering machines dealing with round or rounded cans.

It will thus be seen that I have provided apparatus which is well adapted to accomplish the several objects of my invention in an efficient and economical manner. It will also be seen that the machine described is of inexpensive construction and action, the automatic character of its operation substantially doing away with the necessity for supervision.

Another highly advantageous feature lies in the fact that on account of the flexible nature of the guiding members all tendency to warp or become otherwise distorted by reason of variation of temperature of the several parts is done away with and any expansion or contraction of the wires themselves is permitted by the springs under the tension of which these members are placed, and a track is provided which is level and parallel to the surface of the liquid under all conditions of use of the machine. In this manner there is guaranteed an even depth of immersion of the seam of the can.

It will also be seen that, on account of the certain and positive character of the action of the several elements described, a high rate of output of the machine is readily attained.

Certain of the broad features described in this application are not claimed herein, as they are described and claimed in applicant's copending application for improvements in body forming machines, filed February 20th, 1905, Serial Number 246,472.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

Having described my invention, what I claim as new and desire to secure by Letters Patent is:—

1. In a soldering machine, in combination, a solder bath, supporting members at each end of said bath, wires stretched between said supporting members adapted to guide cans adjacent said bath, means upon said bath adapted to engage said wires and aid in determining the positions thereof, and means adapted to propel cans along said wires into operative relation to said bath.

2. In a soldering machine, in combination, a solder bath, a supporting member at each end thereof and independent of said bath, wires stretched between said supporting members adapted to guide cans adjacent said bath, means upon said bath adapted to engage said wires and aid in determining the positions thereof, means adapted to propel cans along said wires into operative relation to said bath, and springs interposed between one of said supporting members and the ends of said wires and tending to stretch said wires.

3. In a soldering machine, in combination, a solder bath, a supporting member at each end thereof and independent of said bath, wires stretched between said supporting members adapted to guide cans adjacent said bath, means upon said bath adapted to engage said wires and aid in determining the positions thereof, means adapted to propel cans along said wires into operative relation to said bath, springs interposed between one of said supporting members and the ends of said wires and tending to stretch said wires, and means adapted to adjust the tension of said wires.

4. In a soldering machine, in combination, a solder bath, means adapted to engage and support one end of a can, a stretched flexible member adapted to support the lower side of said can, means upon said bath supporting said flexible member in a position in which the same is adapted to hold a can in an inclined position against said first-mentioned supporting means, and means adapted to propel a can along said flexible member in operative relation to said bath.

5. In a soldering machine, in combination, a solder bath, means adapted to engage and support one end of a can, a stretched flexible member adapted to support the lower side of said can, means supporting said flexible member in a position in which the same is adapted to hold a can against said first-mentioned supporting means, and means adapted to propel a can along said flexible member in operative relation to said bath.

6. In a soldering machine, in combination, a solder bath, means adapted to support one end of a can, a flexible member adapted to support the lower side of said can and hold the same against said first-mentioned supporting means in an inclined position, adjustable means supporting said flexible member, means adapted to propel a can along said flexible member in operative relation to said bath and means holding said flexible member under tension.

7. In a soldering machine, in combination, a solder bath, means adapted to support one end of a can, a flexible member adapted to support the lower surface of said can and hold the same against said first-mentioned supporting means in an inclined position, a second flexible member adapted to engage the remaining end of said can, means adapted to propel a can along said first-mentioned flexible member and in operative relation to said bath and means holding said flexible members under tension.

8. In a soldering machine, in combination, a solder bath, means adapted to support one end of a can, a flexible member adapted to support the lower surface of said can and hold the same against said first-mentioned supporting means in an inclined position, a second flexible member adapted to engage the remaining end of said can, means adapted to propel a can along said first-mentioned flexible member and in operative relation to said bath, and adjustable means adapted to engage said second flexible member and aid in determining the position thereof said flexible members being under tension.

9. In a soldering machine, in combination, a solder bath, means adapted to support one end of a can, a flexible member adapted to support the lower surface of said can and hold the same against said first-mentioned supporting means in an inclined position, a second flexible member adapted to engage the remaining end of said can, means adapted to propel a can along said first-mentioned flexible member and in operative relation to said bath, and means upon said bath adapted to engage said flexible members and aid in determining the positions thereof, said last-mentioned means being adjustable with reference to said bath.

10. In a soldering machine, in combination, a solder bath, means adapted to support one end of a can, a flexible member adapted to support the lower side thereof and hold the same in an inclined position against said first-mentioned supporting means, a flexible member adapted to engage the remaining end of said can, independently adjustable means adapted to aid in determining the positions of said flexible members, and means adapted to propel a can along said first-mentioned flexible member in operative relation to said bath.

11. In a soldering machine, in combination, a solder bath, means adapted to support one end of a can, a plurality of stretched flexible members adapted to support the lower side thereof and hold the same in an inclined position against said first-mentioned supporting means, a stretched flexible member engaging the remaining end of said can, means adapted to propel said can along said first-mentioned flexible members in operative relation to said bath.

12. In a soldering machine, in combination, a solder bath, means adapted to support one end of a can, a plurality of flexible members adapted to support the lower side thereof and hold the same in an inclined position against said first-mentioned supporting means, a flexible member engaging the remaining end of said can, means adapted to propel said can along said first-mentioned flexible members in operative relation to said bath, and means adapted to engage and adjust the positions of each of said flexible members.

13. In apparatus of the class described, in combination, a solder bath, a stretched flexible path adapted to support a can in operative relation to said bath, means adapted to propel cans through said path, and means adapted to adjust the position of said path with relation to said bath.

14. In apparatus of the class described, in combination, a solder bath, a supporting path comprising a plurality of stretched flexible wires adapted to support a can in operative relation to said bath, means adapted independently to adjust different portions of said wires with relation to said bath, and means adapted to propel cans through said path.

15. In a soldering machine, in combination, a solder bath, means adapted to engage and support one end of a can, a plurality of stretched flexible wires adapted to engage said can and hold the same against said first-mentioned supporting means in an inclined position and free from contact with other parts, and means adapted to propel said can along said wires in operative relation to said bath.

16. In a soldering machine, in combination, a solder bath, means adapted to support one end of a can, a plurality of spring-pressed wires adapted to support said can against said first-mentioned supporting means in an inclined position, and means adapted to propel said can along said wires in operative relation to said bath.

17. In a soldering machine, in combination, a solder bath, means adapted to support one end of a can, a plurality of spring-pressed wires adapted to support said can against said first-mentioned supporting means in an inclined position, means adapted to propel said can along said wires in operative relation to said bath, and means adapted to adjust the positions of said wires relative to said first-mentioned supporting means.

18. In a soldering machine, in combination, a solder bath, means adapted to support one end of a can, a stretched flexible member adapted to engage the lower side of said can and hold the same in an inclined position against said first-mentioned supporting means, a second stretched flexible member adapted to engage the remaining end of said can, means adapted independently to adjust the positions of said flexible members, and means adapted to propel said can along said flexible members in operative relation to said bath.

19. In a soldering machine, in combination, a solder bath, a supporting member at each end of said bath and independent thereof, stretched flexible wires connecting said supporting members and lying adjacent said bath, means adapted to engage and support one end of a can, means adapted to hold said wires in a position in which they are adapted to support said can in an inclined position against said last-mentioned supporting means, and means adapted to propel a can along said wires in operative relation to said bath and means holding said stretched wires under tension.

20. In a soldering machine, in combination, a solder bath, a supporting member at each end of said bath and independent thereof, spring-stretched wires connecting said supporting members and lying adjacent said bath, means upon said bath adapted to engage and support one end of a can, means adapted to hold said wires in a position in which they are adapted to support said can in an inclined position against said last-mentioned supporting means, means adapted to propel said can along said wires in operative relation to said bath, and means adapted independently to adjust the positions of certain of said wires.

In testimony whereof I affix my signature, in the presence of two witnesses.

CHARLES W. GRAHAM.

Witnesses:
C. H. WILSON,
ARTHUR G. PREVIN.